United States Patent
Yim et al.

(10) Patent No.: US 7,590,989 B2
(45) Date of Patent: Sep. 15, 2009

(54) LOAD BALANCER MANAGEMENT

(75) Inventors: Wing Man Yim, Bellevue, WA (US); Adam B Meltzer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 11/178,014

(22) Filed: Jul. 8, 2005

(65) Prior Publication Data
US 2007/0011685 A1 Jan. 11, 2007

(51) Int. Cl.
G06F 3/00 (2006.01)
G06F 9/46 (2006.01)
G06F 15/173 (2006.01)

(52) U.S. Cl. .................. 719/328; 718/105; 709/224
(58) Field of Classification Search .............. 719/328; 718/328, 105; 709/224
See application file for complete search history.

(56) References Cited

U.S. PATENT DOCUMENTS

| | | | |
|---|---|---|---|
| 6,029,189 A * | 2/2000 | Ishida et al. | 718/105 |
| 6,530,065 B1 * | 3/2003 | McDonald et al. | 716/4 |
| 6,728,748 B1 * | 4/2004 | Mangipudi et al. | 718/105 |
| 7,328,259 B2 * | 2/2008 | Srinivasan et al. | 709/223 |
| 2004/0267920 A1 * | 12/2004 | Hydrie et al. | 709/223 |

\* cited by examiner

*Primary Examiner*—Sough Hyung
*Assistant Examiner*—Lechi Truong
(74) *Attorney, Agent, or Firm*—Lee & Hayes, PLLC

(57) ABSTRACT

Load balancer management is described herein. In one implementation a load balancer system includes servers for hosting content on a network site, disparate load balancers that manage the servers to substantially balance data communications across the servers, and a load balancer management service which includes an application program interface (API) that provides for universal communication with the different interfaces of the disparate load balancers. Each of the disparate load balancers may be controlled via a different interface. The API is configured to receive an instruction set to manage the disparate load balancers, and to communicate the instruction set as translated instruction sets to each of the disparate load balancers via the respective different interfaces. The load balancer management service can be implemented as a Web-based service.

14 Claims, 5 Drawing Sheets

LOAD BALANCER MANAGEMENT

BACKGROUND

A Web-site that is heavily trafficked will often use more than one server for data communications and to serve content, and in many cases the content served by each of these servers will be identical. In a situation where multiple servers are employed, load balancers can be implemented to help manage the data communication traffic for the Web-site. Load balancers are network devices which can be used to distribute the processing and/or communications activity across a Web-site (e.g., balancing traffic to the servers) so that no one server is overwhelmed. For example, if one server is receiving excessive traffic (e.g., excessive user requests), a load balancer can be implemented to redirect some of the traffic to another server which has excess capacity.

The increasing popularity of the Internet has created a need for highly scalable and redundant groups of servers that host content and services over the Internet. The use of network load balancers to create such scalable and redundant environments is now prevalent across enterprise datacenters, where a particular datacenter that hosts content and/or services on the Internet may utilize multiple network load balancers from several different manufacturers in order to establish a scalable and redundant environment.

SUMMARY

This summary is provided to introduce simplified concepts of load balancer management which is further described below in the Detailed Description. This summary is not intended to identify essential features of the claimed subject matter, nor is it intended for use in determining the scope of the claimed subject matter.

In one implementation, a load balancer system includes servers for hosting content on a network site, disparate load balancers configured to manage data communications for the servers so that data communications are substantially balanced across the servers, and a load balancer management service which includes an application program interface (API) that provides for universal communication with the different interfaces of the disparate load balancers. Each of the disparate load balancers may be controlled via a different interface. The API is configured to receive an instruction set to manage the disparate load balancers, and to communicate the instruction set as translated instruction sets to each of the disparate load balancers via the respective different interfaces. The load balancer management service can be implemented as a Web-based service, and other implementations and methods of load balancer management are also described.

BRIEF DESCRIPTION OF THE DRAWINGS

The same numbers are used throughout the drawings to reference like features and components.

DETAILED DESCRIPTION

Load balancer management is described in which embodiments provide techniques to manage load balancers of a system that may include any number of different load balancers. Management of the load balancers is complicated by the fact that the disparate load balancers may utilize different interfaces, have different hardware configurations, respond to different control commands, manage servers in accordance with different protocols, and/or any combination thereof. The disparate load balancers may also have been manufactured by different manufacturers, and/or in some cases, different models of load balancers may be manufactured by the same manufacturer.

Further, the respective interfaces of these disparate load balancers can vary in several ways. For example, some load balancers may require that the user (e.g., developer, programmer, and/or operations personnel) telnet into the devices in order to make configuration changes, while other load balancers will provide various user interfaces for making configuration changes. In some cases, the user who is tasked with managing data communications for a group of servers may need to write a different program for managing each disparate load balancer.

In an embodiment of load balancer management, an application program interface (API) can be implemented to provide for universal communication with the different interfaces of the disparate load balancers. In providing this universal interface, the API abstracts many of the intricacies and complexities of managing the disparate load balancers and, as described below, the API can be provided in the form of a Web-based service.

While aspects of the described systems and methods for load balancer management can be implemented in any number of different computing systems, communication systems, environments, and/or configurations, embodiments of load balancer management are described herein in the context of the following exemplary system architectures.

Figure 1:
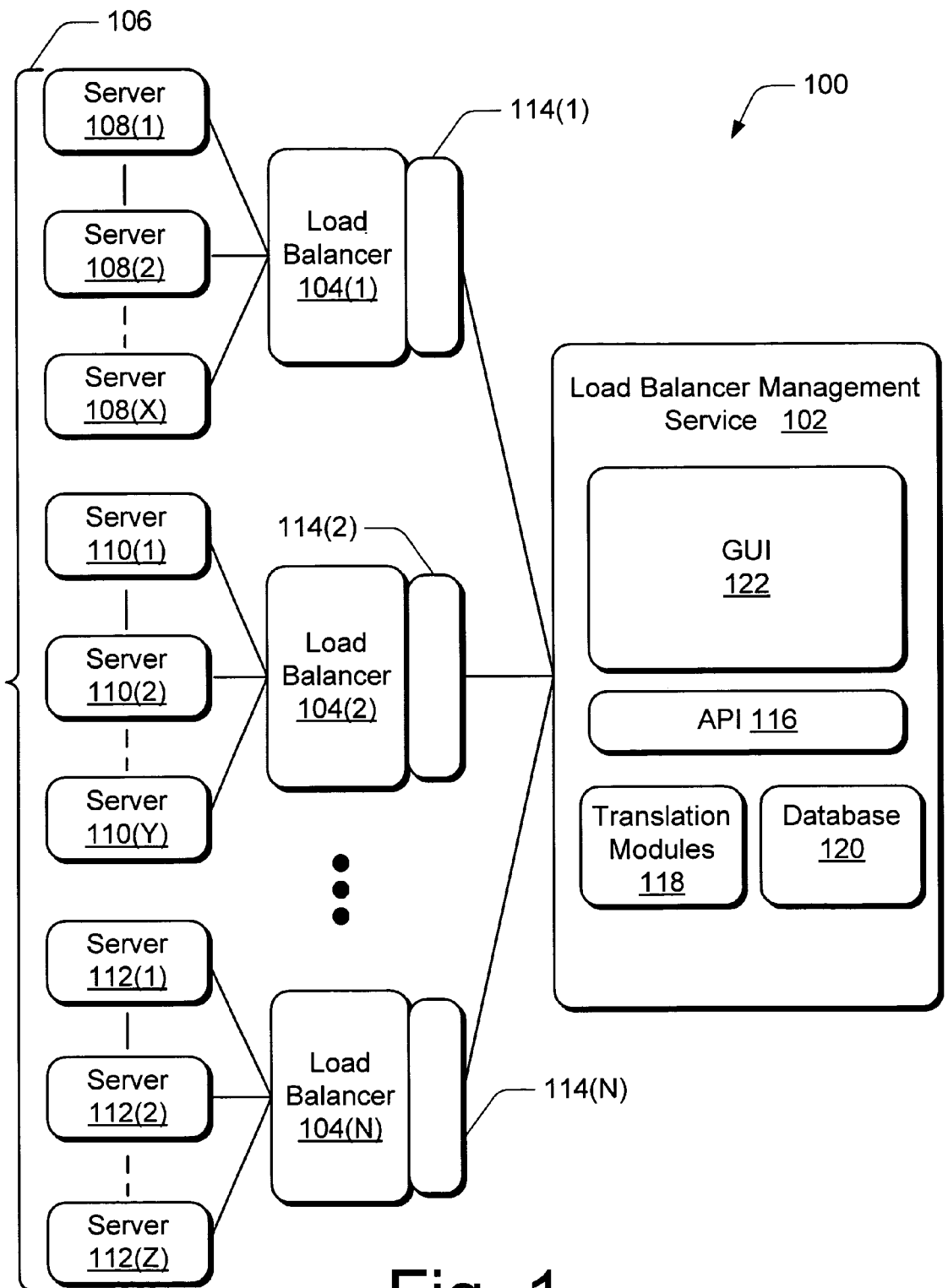
FIG. 1 illustrates an exemplary load balancer system in which embodiments of load balancer management can be implemented.

FIG. 1 illustrates an exemplary load balancer system 100 in which embodiments of load balancer management can be implemented. The system 100 includes a load balancer management service 102, disparate load balancers 104(1-N), and various servers 106 which can be configured to host content for a network site (not shown). The servers 106 can be configured to serve content to a local area network (LAN), a wide area network (WAN) (e.g., the Internet or World Wide Web), a campus area network (CAN), a metropolitan area network (MAN), a home area network (HAN), and/or any other type of network. In some implementations described below, the servers 106 are Web servers and the network site is a Web-site.

In this example, the group of servers 106 are divided into subgroups of servers 108(1-X), 110(1-Y), and 112(1-Z), which are respectively managed by the disparate load balancers 104(1-N). Each of the disparate load balancers 104(1-N) are configured to manage data communication for one or more of the server subgroups such that data communications are substantially balanced across the servers of a subgroup. For example, load balancer 104(1) manages data communications for servers 108(1-X), load balancer 104(2) manages data communications for servers 110(1-Y), and so forth. Each of these disparate load balancers 104(1-N) may be configured to be controlled via a respective different interface 114(1-N).

The exemplary load balancer system 100 can include any number of servers 106, and can also include any number of disparate load balancers 104(1-N) for managing data flow at the servers 106. The system 100 can also include more than one identical load balancer, such as load balancers that use a similar interface). If identical load balancers are employed, the API 116 of the load balancer management service 102 can also be used for universal communication to each of the identical load balancers. Multiple identical load balancers are not shown in the Figures.

The load balancer management service 102 includes an application program interface (API) 116 that provides for universal communication with the different interfaces 114(1-N) of the disparate load balancers 104(1-N). The API 116 can be implemented to receive an instruction set to manage all of the disparate load balancers 104(1-N), and to communicate the instruction set as individually translated instruction sets to each of the disparate load balancers 104(1-N) via the respective different interfaces 114(1-N). Translation of the instruction set into the translated instruction sets can be performed by translation modules 118 included in the load balancer management service 102. The translation modules 118 can be implemented as a component of the load balancer management service 102 (as shown in FIG. 1) and/or as a remote component.

The load balancer management service 102 can also include a data base 120 for storing network information, security information, and/or any other information for the implementation of a load balancer management system. The data base 120 can be implemented as a component of the load balancer management service 102 (as shown in FIG. 1) and/or as a remote component from which the stored information can be accessed. The load balancer management service 102 can also include a graphical user interface 122 via which a user can enter the instruction set which is to be used to manage each of the disparate load balancers 104(1-N) via the respective different interfaces 114(1-N).

Figure 2:
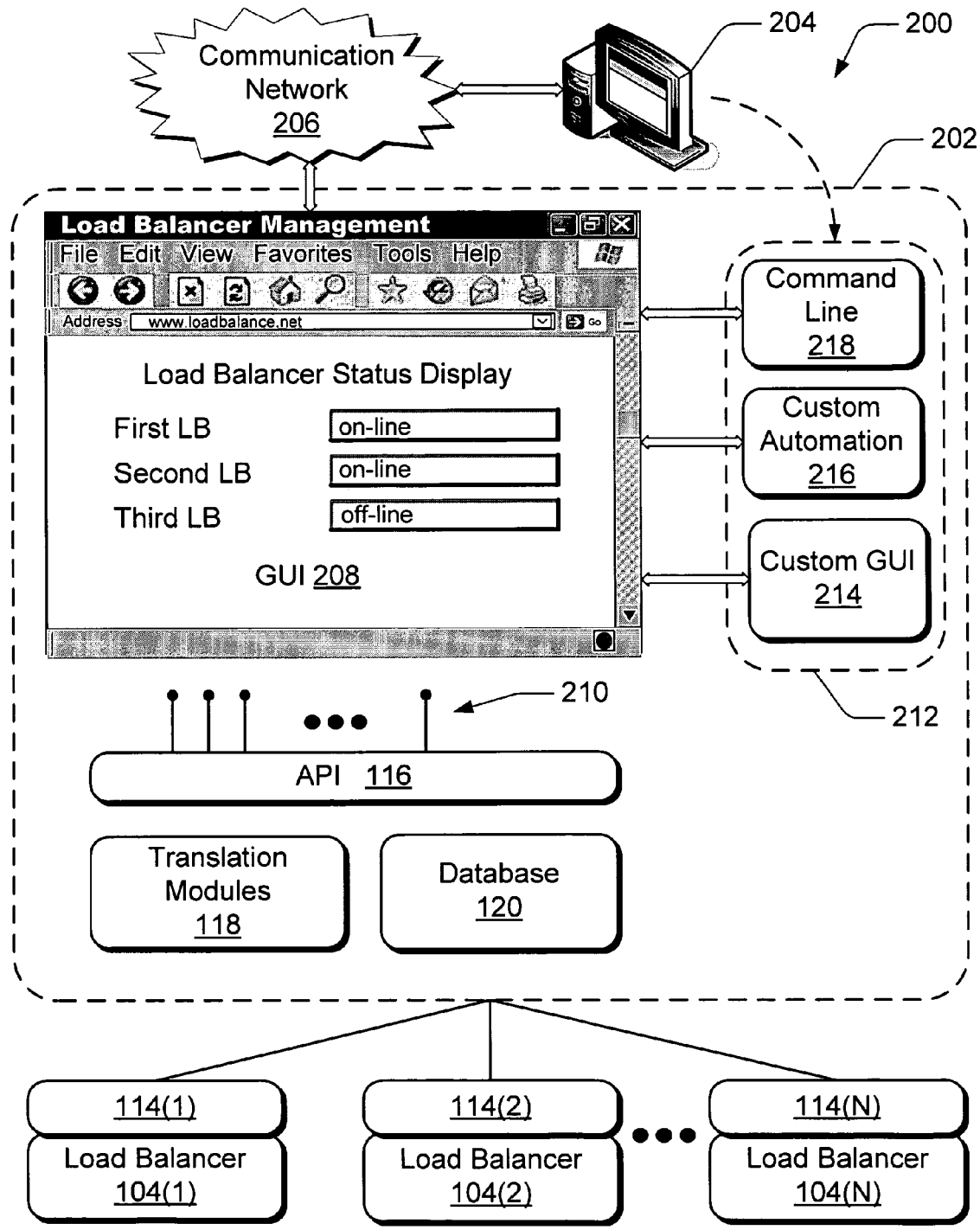
FIG. 2 illustrates an exemplary environment in which embodiments of load balancer management can be implemented.

FIG. 2 illustrates an exemplary environment 200 in which further implementations of the load balancer management can be described. For example, the load balancer management service can be implemented as a Web-based service 202 which can be made available to a user at a computing device 204 via a communication network 206, such as the Internet. The computing device 204 can include a Web browser application via which the user can access a graphical user interface 208 of the Web-based service 202 via the communication network 206. The user at computing device 204 can utilize the graphical user interface 208 to monitor and/or manage the disparate load balancers 104(1-N). For example, the user can utilize the graphical user interface 208 to determine which of the servers 106 are connected to which of the disparate load balancers 104(1-N). The graphical user interface 208 can also be used for putting a server 106 "on-line" (i.e., placing a server in use) or taking a server 106 "off-line" (i.e., removing a server from use).

The graphical user interface 208 of the Web-based service 202 can be implemented in the form of an ASP.NET front end that is built on top of a back end API 116 in the form of a .NET Web service. Any number of API methods 210 can be implemented for communication between the API 116 and the graphical user interface 208.

The user at computing device 204 can also utilize the Web-based service 202 to develop, build, and/or generate custom applications 212 which can be implemented to communicate with the different interfaces 114(1-N) via the API 116 to manage the disparate load balancers 104(1-N). For example, the user at computing device 204 can create a custom graphical user interface 214, custom automation scripts 216, and/or command line scripts 218 via the load balancer management graphical user interface 208. By providing a user (e.g., at client device 204) of the Web-based service 202 with tools to create custom applications 212, the Web-based service 202 provides greater flexibility to uniformly and collectively manage the disparate load balancers 104(1-N).

Methods for load balancer management such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
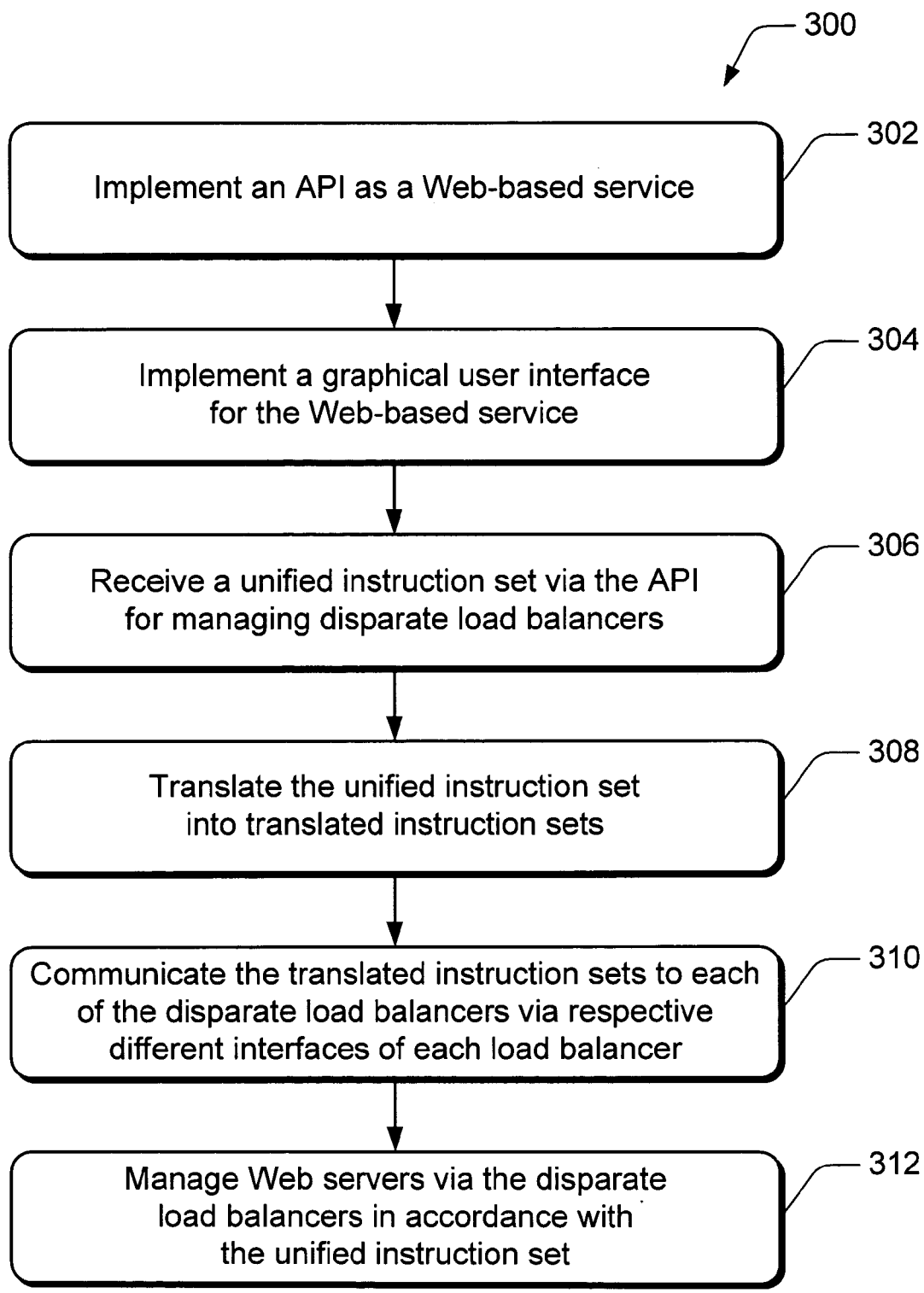
FIG. 3 is a flow diagram that illustrates an exemplary method for load balancer management.

FIG. 3 illustrates an exemplary method 300 for load balancer management and is described with reference to the load balancer management system and environment shown in FIGS. 1 and 2. The order in which the method is described is not intended to be construed as a limitation, and any number of the described method blocks can be combined in any order to implement the method. Furthermore, the method can be implemented in any suitable hardware, software, firmware, or combination thereof.

At block 302, an API is implemented as a Web-based service. For example, API 116 can be implemented as Web-based service 202. As described previously, the Web-based service 202 can be accessed via a communication network 206, such as the Internet, to collectively manage the disparate load balancers 104(1-N).

At block 304, a graphical user interface is implemented for the Web-based service. For example, graphical user interface 208 can be implemented with the Web-based service 202.

At block 306, a unified instruction set is received via the API to manage disparate load balancers. For example, a unified instruction set can be received via the API 116 of the Web-based service 202. The unified instruction set which is received via the API 116, can for example have been generated at a remote user device 204, and then communicated to the API 116 via the communications network 206.

At block 308, the unified instruction set is translated into translated instruction sets. For example, the unified instruction set which is received via the API 116 of the Web-based service 202 can be translated into translated instruction sets that each correspond to a different one of the different interfaces 114(1-N). The Web-based service 202 includes translation modules 118 for processing the unified instruction set to generate the translated instruction sets which are formatted for communication to the different interfaces 114(1-N) to collectively manage the respective disparate load balancers 104(1-N).

At block 310, the translated instruction sets are communicated to each of the disparate load balancers via the respective different interfaces of each load balancer. For example, the translated instruction sets can be communicated to each of the disparate load balancers 104(1-N) via the respective different interfaces 114(1-N). The translated instruction sets can then be used to collectively manage the disparate load balancers 104(1-N).

At block 312, the Web servers are managed via the disparate load balancers in accordance with the unified instruction set. For example, Web servers 106 can be managed via the disparate load balancers 104(1-N) in accordance with the unified instruction set such that data processing and/or data communications are substantially balanced across the Web servers 106. By way of example, managing the Web servers 106 via the disparate load balancers 104(1-N) in accordance with the unified instruction set can include such things as taking a Web server "off-line" and/or placing a Web server "on-line".

Figure 4:
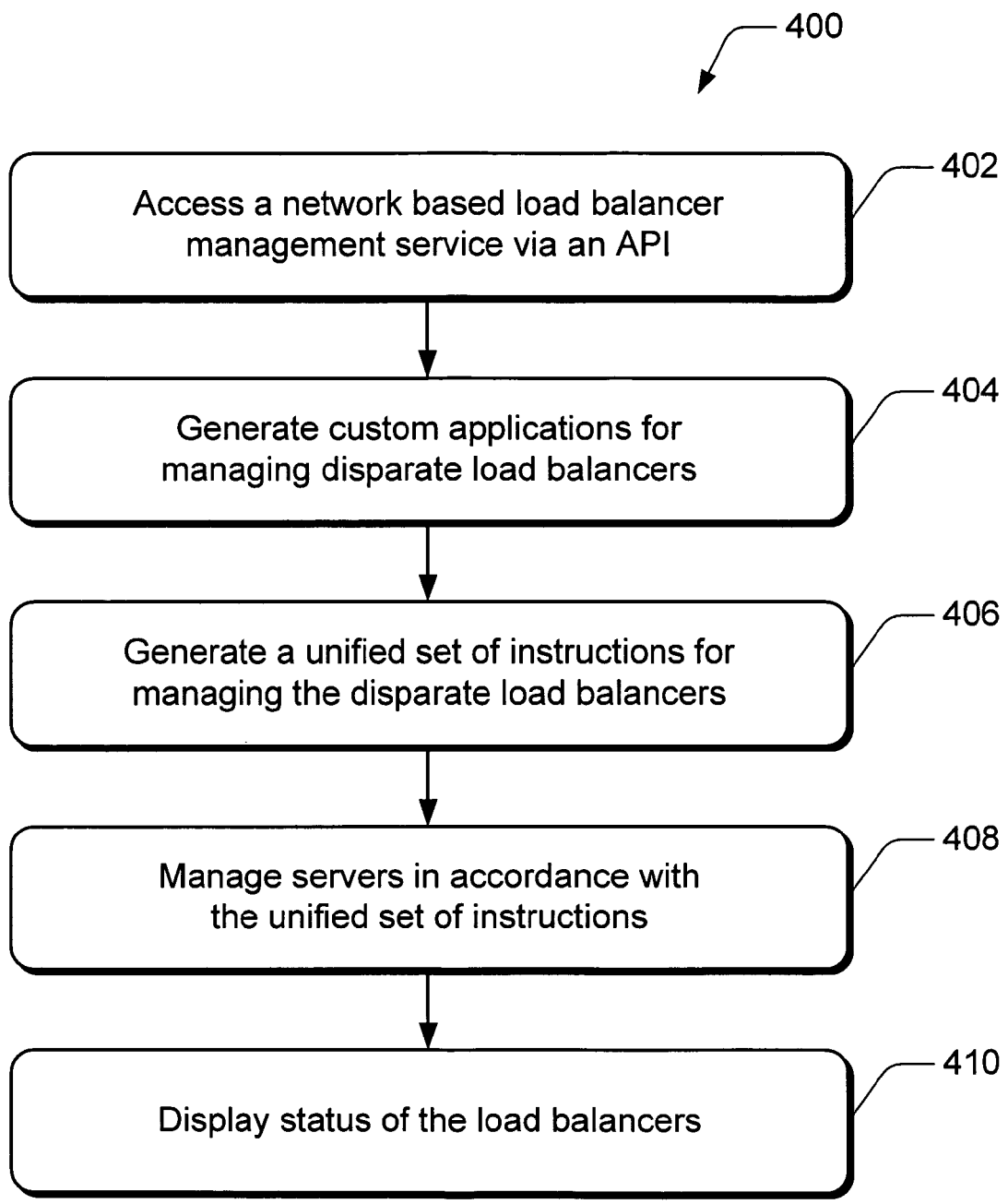
FIG. 4 is a flow diagram that illustrates another exemplary method for load balancer management.

FIG. 4 illustrates an exemplary method 400 for load balancer management and is described with reference to the load balancer management system and environment shown in FIGS. 1 and 2. The order in which the method is described is not intended to be construed as a limitation, and any number of the described method blocks can be combined in any order to implement the method. Furthermore, the method can be implemented in any suitable hardware, software, firmware, or combination thereof.

At block 402, a network based load balancer management service is accessed via an API. For example, a user at computing device 204 can use a Web browser to access Web-base service 202 via API 116.

At block 404, custom applications for managing disparate load balancers are generated. For example, the user at computing device 204 can utilize the graphical user interface 208 to develop custom applications 212 for managing one or more of the disparate load balancers 104(1-N).

At block 406, a unified set of instructions for managing the disparate load balancers is generated. For example, the user at computing device 204 can utilize the graphical user interface 208 to generate a unified set of instructions for managing the disparate load balancers 104(1-N).

At block 408, servers are managed in accordance with the unified set of instructions. For example, servers 106 can be managed via the disparate load balancers 104(1-N) in accordance with the unified instruction set generated at user device 204. As described above, the Web-based service 202 translates the unified instruction set so that the different interfaces 114(1-N) of the disparate load balancers 104(1-N) can each process the translated instruction sets which they receive. The disparate load balancers 104(1-N) can in turn manages the servers 106 such that data processing and/or data communications are substantially balanced across the servers 106.

At block 410, the status of the load balancers is displayed. For example, the graphical user interface 208 can display the status of each of the disparate load balancers 104(1-N) such that a user at computing device 204 can monitor the status and any other information associated with managing the disparate load balancers 104(1-N). In FIG. 2, the exemplary graphical user interface 208 is shown to provide a "Load Balancer Status Display" which can display the status of each of the load balancers 110(1-N). For example, the "First LB" (e.g., disparate load balancer 110(1)) is shown to be "on-line", the "Second LB" (e.g., disparate load balancer 110(2)) is shown to be "on-line", and so forth.

Figure 5:
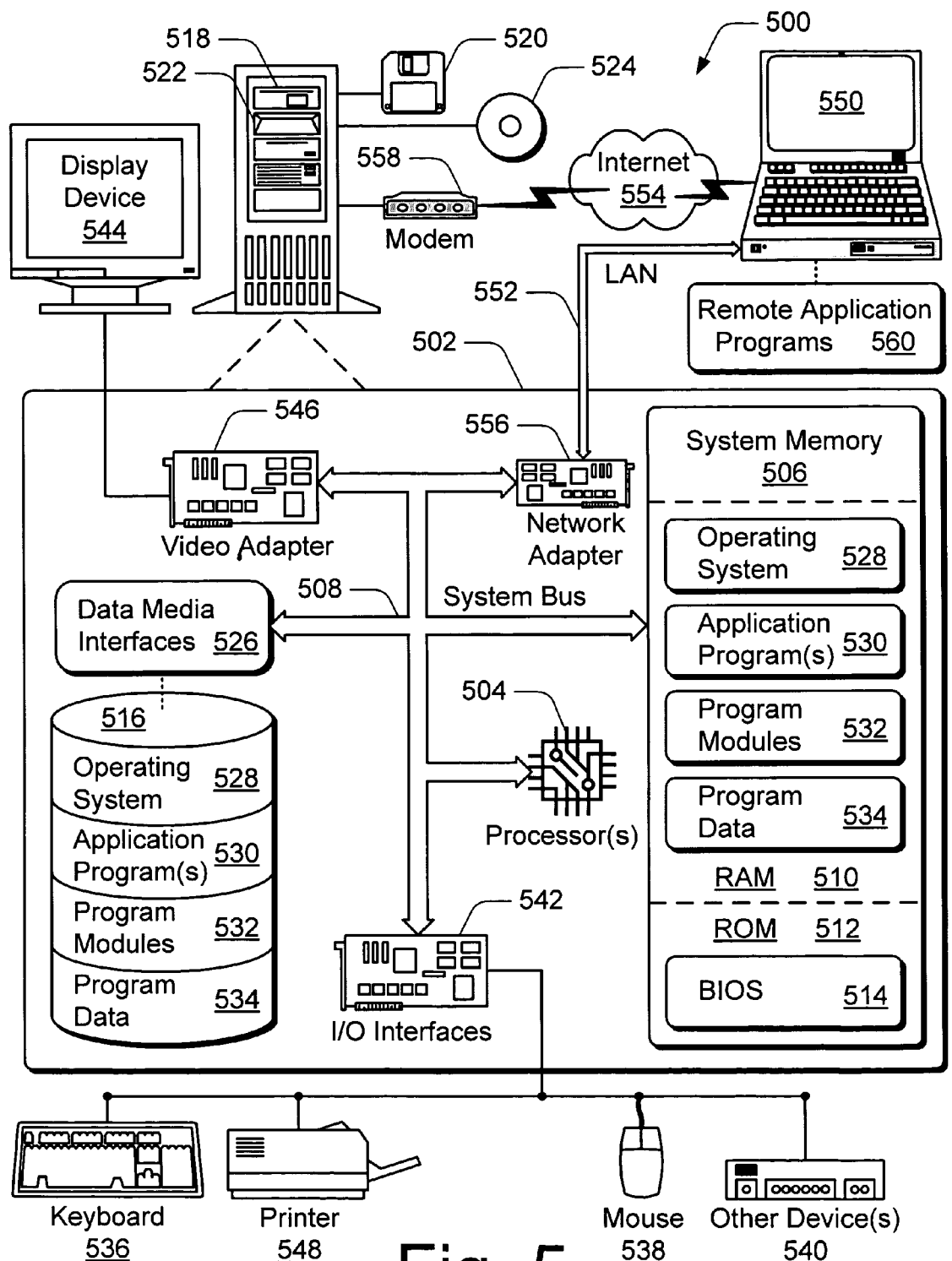
FIG. 5 illustrates exemplary computing systems, devices, and components in an environment that load balancer management can be implemented.

FIG. 5 illustrates an exemplary computing environment 500 within which load balancer management systems and methods, as well as the computing, network, and system architectures described herein, can be either fully or partially implemented. Exemplary computing environment 500 is only one example of a computing system and is not intended to suggest any limitation as to the scope of use or functionality of the architectures. Neither should the computing environment 500 be interpreted as having any dependency or requirement relating to any one or combination of components illustrated in the exemplary computing environment 500.

The computer and network architectures in computing environment 500 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 500 includes a general-purpose computing system in the form of a computing device 502. The components of computing device 502 can include, but are not limited to, one or more processors 504 (e.g., any of microprocessors, controllers, and the like), a system memory 506, and a system bus 508 that couples the various system components. The one or more processors 504 process various computer executable instructions to control the operation of computing device 502 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by computing device 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514 maintains the basic routines that facilitate information transfer between components within computing device 502, such as during start-up, and is stored in ROM 512. RAM 510 typically contains data and/or program modules that are immediately accessible to and/or presently operated on by one or more of the processors 504.

Computing device 502 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for computing device 502.

Any number of program modules can be stored on RAM 510, ROM 512, hard disk 516, magnetic disk 520, and/or optical disk 524, including by way of example, an operating system 528, one or more application programs 530, other program modules 532, and program data 534. Each of such operating system 528, application program(s) 530, other program modules 532, program data 534, or any combination thereof, may include one or more embodiments of the systems and methods described herein.

Computing device 502 can include a variety of computer readable media identified as communication media. Communication media typically embodies computer readable instructions, data structures, program modules, or other data. By way of example and not limitation, communication media includes wired media such as a wired network or direct-wired connection, and wireless media such as acoustic, RF, infrared, other wireless media, and/or any combination thereof.

A user can interface with computing device 502 via any number of different input devices such as a keyboard 536 and pointing device 538 (e.g., a "mouse"). Other input devices 540 (not shown specifically) may include a microphone, joystick, game pad, controller, satellite dish, serial port, scanner, and/or the like. These and other input devices are connected to the processors 504 via input/output interfaces 542 that are coupled to the system bus 508, but may be connected by other interface and bus structures, such as a parallel port, game port, and/or a universal serial bus (USB).

A display device 544 (or other type of monitor) can be connected to the system bus 508 via an interface, such as a video adapter 546. In addition to the display device 544, other output peripheral devices can include components such as speakers (not shown) and a printer 548 which can be connected to computing device 502 via the input/output interfaces 542.

Computing device 502 can operate in a networked environment using logical connections to one or more remote computers, such as remote computing device 550. By way of example, remote computing device 550 can be a personal computer, portable computer, a server, a router, a network computer, a peer device or other common network node, and the like. The remote computing device 550 is illustrated as a portable computer that can include any number and combination of the different components, elements, and features described herein relative to computing device 502.

Logical connections between computing device 502 and the remote computing device 550 are depicted as a local area network (LAN) 552 and a general wide area network (WAN) 554. Such networking environments are commonplace in offices, enterprise-wide computer networks, intranets, and the Internet. When implemented in a LAN networking environment, the computing device 502 is connected to a local network 552 via a network interface or adapter 556. When implemented in a WAN networking environment, the computing device 502 typically includes a modem 558 or other means for establishing communications over the wide area network 554. The modem 558 can be internal or external to computing device 502, and can be connected to the system bus 508 via the input/output interfaces 542 or other appropriate mechanisms. The illustrated network connections are merely exemplary and other means of establishing communication link(s) between the computing devices 502 and 550 can be utilized.

In a networked environment, such as that illustrated with computing environment 500, program modules depicted relative to the computing device 502, or portions thereof, may be stored in a remote memory storage device. By way of example, remote application programs 560 are maintained with a memory device of remote computing device 550. For purposes of illustration, application programs and other executable program components, such as operating system 528, are illustrated herein as discrete blocks, although it is recognized that such programs and components reside at various times in different storage components of the computing device 502, and are executed by the one or more processors 504 of the computing device 502.

Although embodiments of load balancer management have been described in language specific to structural features and/or methods, it is to be understood that the subject of the appended claims is not necessarily limited to the specific features or methods described. Rather, the specific features and methods are disclosed as exemplary implementations of load balancer management.

The invention claimed is:

1. A load balancer system comprising:
a processor;
a memory;
servers configured to host content for a network site;
disparate load balancers configured to manage data communications for one or more of the servers such that the data communications are substantially balanced across the servers, each of the disparate load balancers further configured to be controlled via a respective different interface of different interfaces, wherein the each of the disparate load balancers manages traffic to the one or more of the servers;
a load balancer management service including an application program interface (API) on the memory that provides universal communication with the different interfaces of the disparate load balancers, the API configured to receive an instruction set to manage the disparate load balancers, the API further configured to communicate the instruction set as translated instruction sets to the disparate load balancers, wherein each respective translated instruction set of the translated instruction sets is communicated to the each of the disparate load balancers via the respective different interface such that the respective different interface processes the each respective translated instruction set that corresponds to the respective different interface to control the each of the disparate load balancers, wherein the instruction set includes instructions for taking a server of the servers offline and instructions for placing a server of the servers online,
wherein the load balancer management service includes translation modules configured to translate on the processor the instruction set received by the API into the translated instruction sets that are each recognized by the respective different interface of the each of the disparate load balancers,
wherein the servers are Web servers and the network site is a web-site and wherein the load balancer management service is implement as a Web-based service, and
wherein the load balancer management service includes a graphical user interface via which a user develops a custom automation script to communicate with the different interfaces via the API to manage the disparate load balancers.

2. A load balancer system as recited in claim 1, wherein the load balancer management service includes the graphical user interface via which the user can enter the instruction set to manage the each of the disparate load balancers via the different interfaces.

3. A load balancer system as recited in claim 1, wherein the load balancer management service is implemented as the Web-based service, and wherein the user can utilize the Web-based service to develop a custom application configured to communicate with the different interfaces via the API to manage the disparate load balancers.

4. A load balancer system as recited in claim 1, wherein the load balancer management service is implemented as the Web-based service, and wherein the user can utilize the Web-based service to develop a custom graphical user interface to communicate with the different interfaces via the API to manage the disparate load balancers.

5. A method comprising:
configuring servers to host content for a network site;
configuring a plurality of disparate load balancers to manage data communications for one or more of the servers such that the data communications are substantially balanced across the servers;
receiving a unified instruction set to manage the plurality of the disparate load balancers via an application program interface (API) of a load balancer management service, wherein the application program interface (API) that provides universal communication with different interfaces of the disparate load balancers, wherein each of the disparate load balancers is controlled via each respective different interface of different interfaces, and wherein the each of the disparate load balancers manages traffic to the one or more of the servers;
translating the unified instruction set by a processor into translated instruction sets that each respective translated instruction set of the translated instruction sets corresponds to the each respective different interface such that the each respective different interface processes the each respective translated instruction set to control the each of the disparate load balancers, wherein the unified instruction set comprises instructions for taking a sewer of the severs offline and instructions for placing a sewer of the servers online; and
communicating the each respective translated instruction set of the translated instruction sets to the each of the disparate load balancers by using the API via the each respective different interface to collectively manage the plurality of the disparate load balancers,
wherein the load balancer management service includes translation modules configured to translate the unified instruction set received by the API into the translated instruction sets that are each recognized by the each respective different interface of the each of the disparate load balancers,
wherein the servers are Web servers and the network site is a web-site and wherein the load balancer management service is implement as a Web-based service, and
wherein the load balancer management service includes a graphical user interface via which a user develops a custom automation script to communicate with the different interfaces via the API to manage the disparate load balancers.

6. A method as recited in claim 5, further comprising managing the Web servers via the disparate load balancers in accordance with the unified instruction set such that data processing and the data communications are substantially balanced across the Web servers.

7. A method as recited in claim 5, wherein the Web-based service which is accessible via an internet to collectively manage the disparate load balancers with the unified instruction set.

8. A method as recited in claim 5, wherein the user enters the unified instruction set to manage the disparate load balancers via the API.

9. A method as recited in claim 5, wherein the user uses the custom automation script to manage the disparate load balancers via the API.

10. A method as recited in claim 5, wherein the user uses a custom graphical user interface to manage the disparate load balancers via the API.

11. A computer readable storage media comprising computer executable instructions that, when executed by a processor, direct a load balancer system to perform acts comprising:
configuring servers to host content for a network site;
configuring dissimilar model load balancers to manage data communications for one or more of the servers such that the data communications are substantially balanced across the servers;
receiving a unified instruction set to manage a plurality of the dissimilar model load balancers via an application program interface (API) of a load balancer management service, wherein the application program interface (API) that provides universal communication with different interfaces of the dissimilar model load balancers, wherein each of the dissimilar model load balancers is controlled via a respective different interface of the different interfaces, and wherein the each of the dissimilar model load balancers manages traffic to the one or more of the servers;
translating the unified instruction set by the processor into translated instruction sets, wherein each respective translated instruction set of the translated instruction sets corresponds to the respective different interface such that the respective different interface processes the each respective translated instruction set to control the each of the dissimilar model load balancers, and wherein the unified instruction set comprises instructions for taking a server of the servers offline and instructions for placing a server of the servers online;
communicating the each respective translated instruction set of the translated instruction sets to the each of the dissimilar model load balancers by using the API via the respective different interface to collectively manage the plurality of the dissimilar model load balancers,
wherein the load balancer management service includes translation modules configured to translate the unified instruction set received by the API into the translated instruction sets that are each recognized by the respective different interface of the each of the dissimilar model load balancers;
wherein the servers are Web servers and the network site is a web-site and wherein the load balancer management service is implement as a Web-based service, and
wherein the load balancer management service includes a graphical user interface via which a user develops a custom automation script to communicate with the different interfaces via the API to manage the dissimilar model load balancers.

12. A computer readable storage media as recited in claim 11, further comprising directing the load balancing management service to implement the graphical user interface via which the user manages the dissimilar model load balancers to substantially balance data processing and the data communications across the servers that are controlled by the dissimilar model load balancers.

13. A computer readable storage media as recited in claim 11, further comprising directing the load balancer management service to implement the graphical user interface via which the user develops at least one of the custom automation script or a custom graphical user interface to manage the plurality of the dissimilar model load balancers.

14. A computer readable storage media as recited in claim 11, further comprising directing the load balancer management service to manage the Web servers that are each controlled by one or more of the dissimilar model load balancers via the API of the load balancer management service.

* * * * *